United States Patent
Osborn et al.

(10) Patent No.: US 9,858,221 B2
(45) Date of Patent: Jan. 2, 2018

(54) PRODUCER/CONSUMER REMOTE SYNCHRONIZATION

(71) Applicant: Nvidia Corporation, Santa Clara, CA (US)

(72) Inventors: Mike Osborn, Westford, MA (US); Mark Hummel, Westford, MA (US); Jonathan Owen, Westford, MA (US); Samuel Hammond Duncan, Westford, MA (US)

(73) Assignee: Nvidia Corporation, Santa Clara, CA (US)

( * ) Notice: Subject to any disclaimer, the term of this patent is extended or adjusted under 35 U.S.C. 154(b) by 208 days.

(21) Appl. No.: 15/043,671

(22) Filed: Feb. 15, 2016

(65) Prior Publication Data
US 2017/0235690 A1    Aug. 17, 2017

(51) Int. Cl.
*G06F 13/28* (2006.01)
*G06F 13/40* (2006.01)
*G06F 13/32* (2006.01)

(52) U.S. Cl.
CPC .......... *G06F 13/28* (2013.01); *G06F 13/4027* (2013.01); *G06F 13/32* (2013.01)

(58) Field of Classification Search
CPC ..................................................... G06F 13/14
USPC ........................................................ 710/308
See application file for complete search history.

(56) References Cited

U.S. PATENT DOCUMENTS

| | | | | |
|---|---|---|---|---|
| 5,905,876 A | * | 5/1999 | Pawlowski | G06F 13/1642 710/112 |
| 2003/0145136 A1 | * | 7/2003 | Tierney | G06F 9/3834 710/3 |
| 2011/0072164 A1 | * | 3/2011 | Ajanovic | G06F 1/3203 710/6 |
| 2013/0097353 A1 | * | 4/2013 | Ajanovic | G06F 1/3203 710/313 |
| 2015/0161050 A1 | * | 6/2015 | Ajanovic | G06F 1/3203 711/146 |

* cited by examiner

*Primary Examiner* — Titus Wong
(74) *Attorney, Agent, or Firm* — Rich Domingo; Parker Justiss, P.C.

(57) ABSTRACT

Remotely synchronizing data communicated in an electronic computing system. Ordered writing of a data set of discrete data packets (data) and a following associated semaphore packet (semaphore) from a source electronic device (source) to a bridge interface device (bridge). Relaxed writing of the data set from the bridge to discrete target memory addresses (targets) of a data-consuming electronic device (consumer), wherein the order of the data and the semaphore written to the targets is different than the order of the data and semaphore written with the ordered writing. Monitoring, by the consumer, the relaxed writing of the semaphore to one of the targets. Issuing a synchronization command to the bridge upon detection of the semaphore having been written to the one target. Sending a synchronization confirmation reply from the bridge after all of the data has been written to the targets.

20 Claims, 6 Drawing Sheets

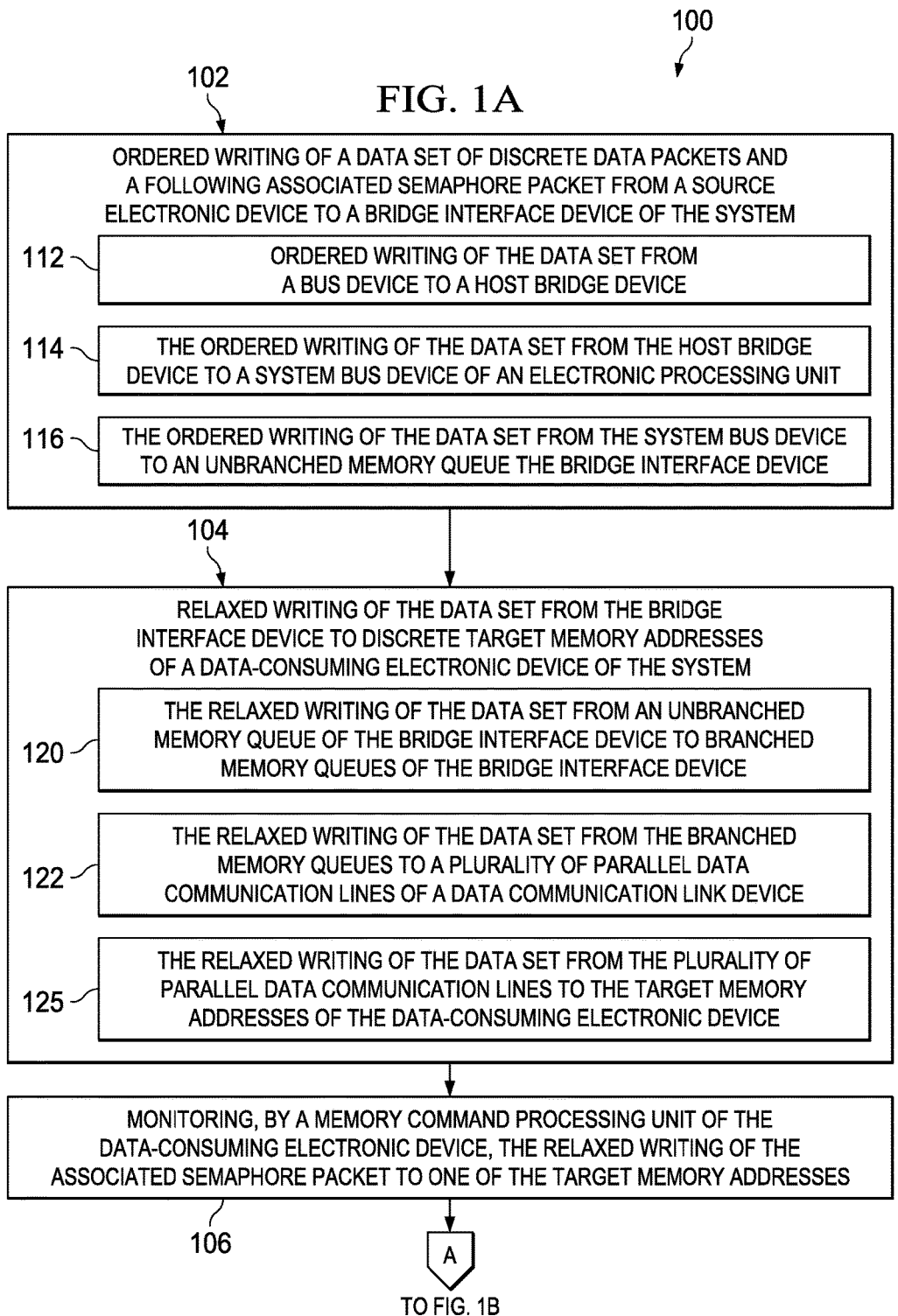

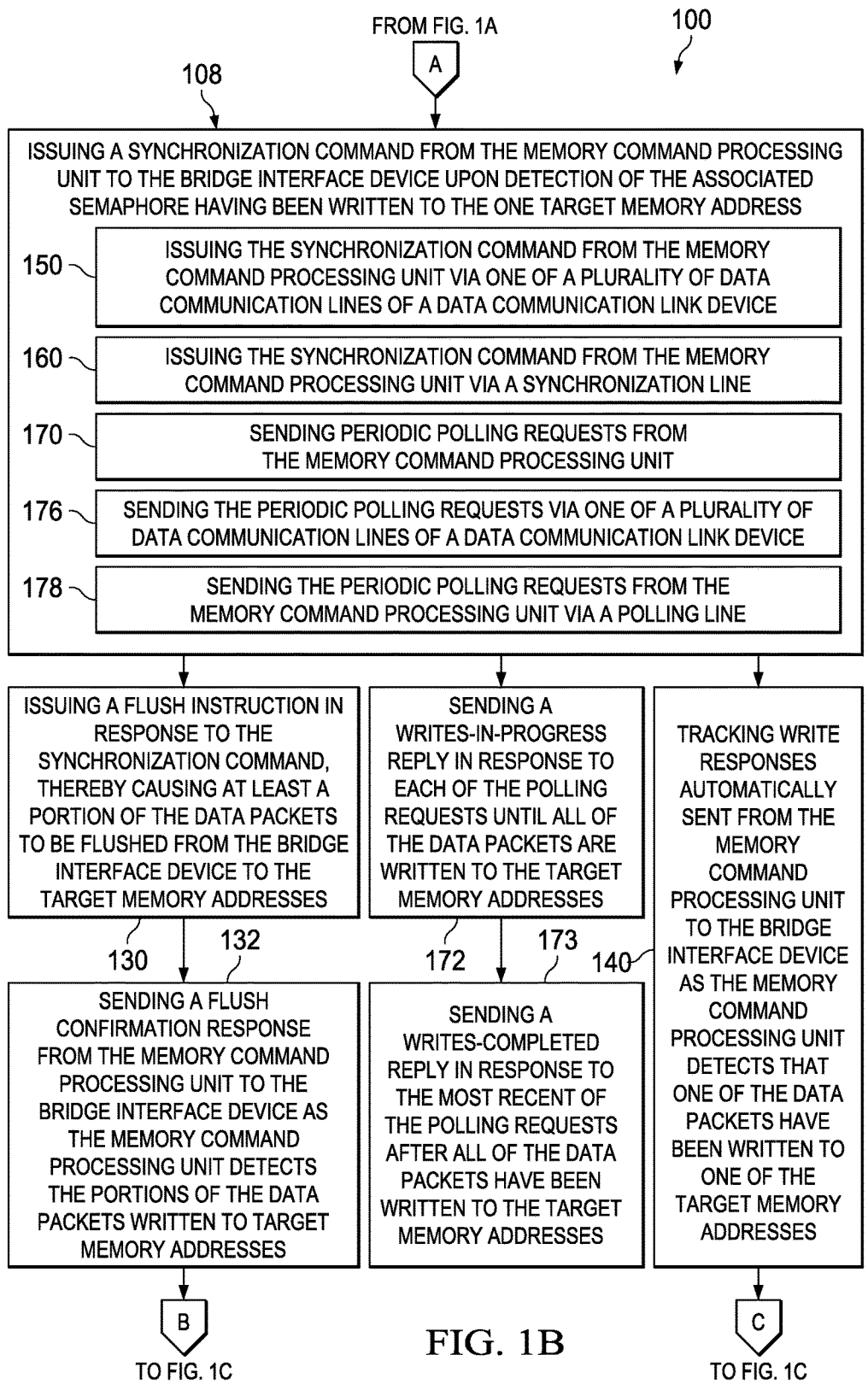

PRODUCER/CONSUMER REMOTE SYNCHRONIZATION

TECHNICAL FIELD

Figure 1C:
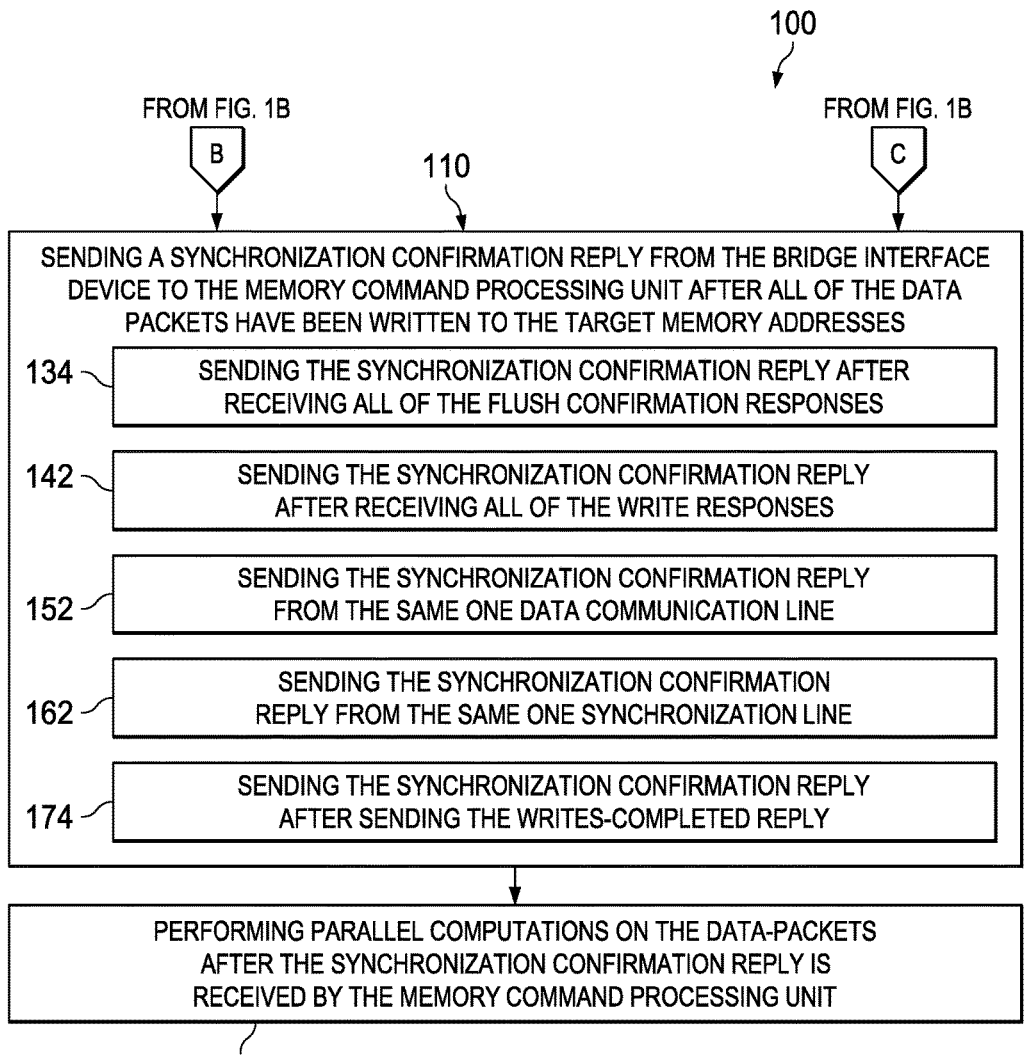

This application is directed, in general, to a method of communicating data in an electronic computing system, and, more specifically, to remotely synchronizing data communicated between different electronic devices of the system.

BACKGROUND

Software operating on multi-processor computing systems often encounters a producer-consumer problem, where a data-producing source device is unable to guarantee an expected ordered writing of packets of data and an associated semaphore to a target buffer memory location accessed by a data-consuming computer processing unit of the system. One solution to this problem is to configure the source device to require a strict ordered writing of the data and semaphore packets to the target memory locations, but, this comes at a cost of reduced data transfer rates. Another solution is to configure the source device to cause an interrupt and force all data writes to be visible in memory upon detecting the semaphore write, but, this also comes at the cost of reduced rates of data transfer and increased latency.

SUMMARY

One aspect provides a method of remotely synchronizing data communicated in an electronic computing system. The method comprises ordered writing of a data set of discrete data packets and a following associated semaphore packet from a source electronic device to a bridge interface device of the system. The method comprises relaxed writing of the data set from the bridge interface device to discrete target memory addresses of a data-consuming electronic device of the system, wherein the order of the data packets and the associated semaphore packet written to the target memory addresses is different than the order of the data packets and associated semaphore packet written with the ordered writing. The method comprises monitoring, by a memory command processing unit of the data-consuming electronic device, the relaxed writing of the associated semaphore packet to one of the target memory addresses. The method comprises issuing a synchronization command from the memory command processing unit to the bridge interface device upon detection of the associated semaphore having been written to the one target memory address. The method comprises sending a synchronization confirmation reply from the bridge interface device to the memory command processing unit after all of the data packets have been written to the target memory addresses.

Another aspect is an electronic computing system for remotely synchronizing communicated data. The system comprises a bridge interface device and a source electronic device. The source electronic device is configured to provide an ordered writing of a data set of discrete data packets and a following associated semaphore packet from the source electronic device to the bridge interface device. The system comprises a data-consuming electronic device, wherein the bridge interface device is configured to provide relaxed writing of the data set to discrete target memory addresses of the data-consuming electronic device. The order of the data packets and the associated semaphore packet written with the relaxed writing to the target memory addresses is different than the order of the data packets and associated semaphore packet written with the ordered writing. A memory command processing unit of the data-consuming electronic device is configured to monitor the relaxed writing of the associated semaphore packet to one of the target memory addresses. The memory command processing unit is configured to issue a synchronization command to the bridge interface device upon detection of the associated semaphore having been written to the one target memory address. The bridge interface device is configured to send a synchronization confirmation reply to the memory command processing unit after all of the data packets have been written to the target memory addresses.

BRIEF DESCRIPTION

Figure 2:
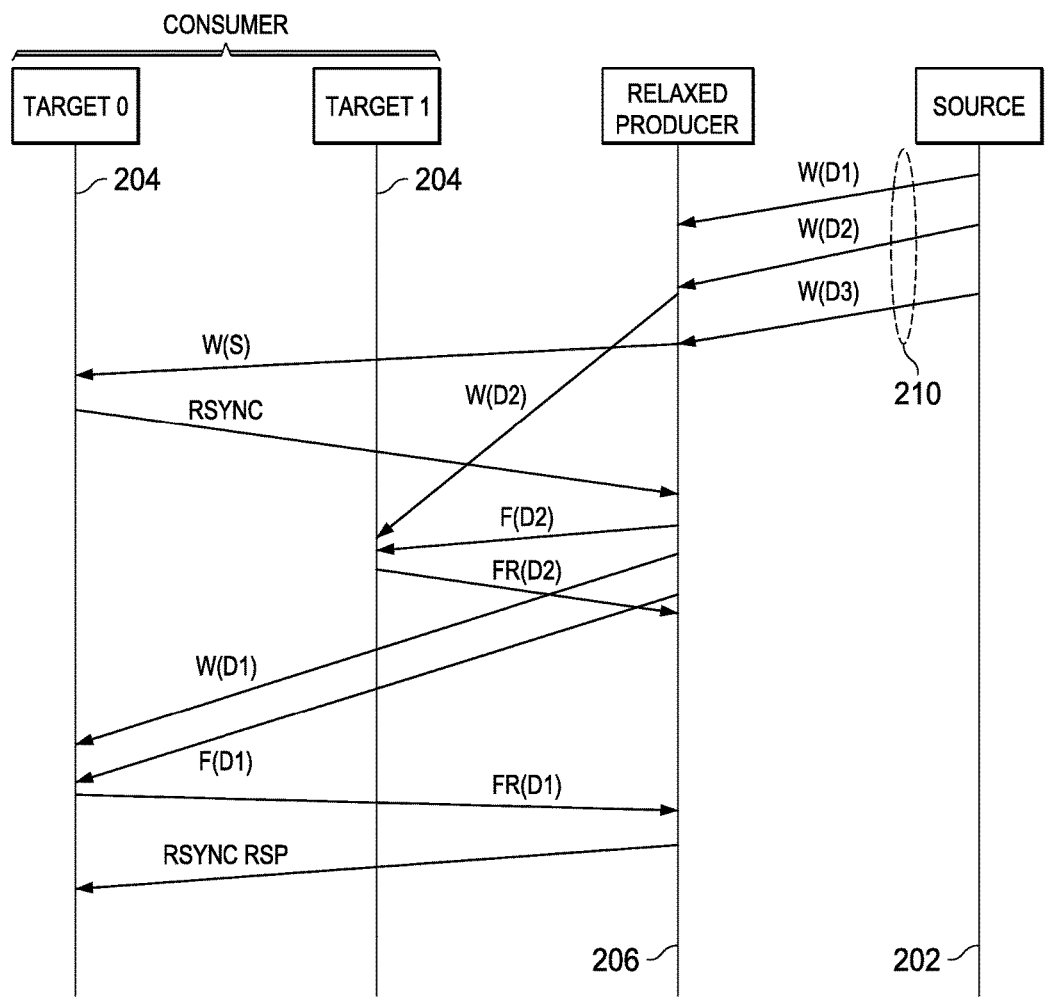
Figure 3:
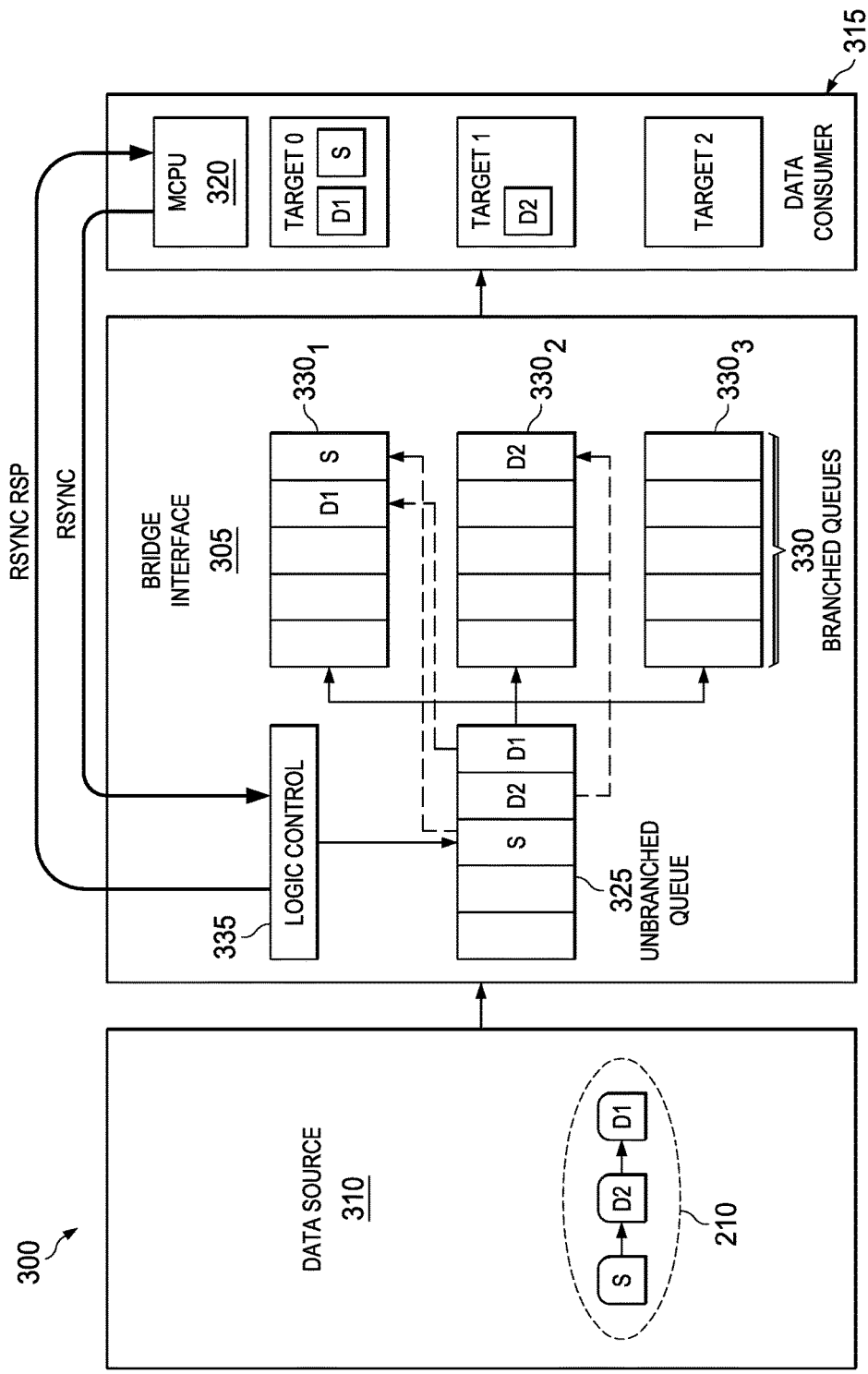
Figure 4:
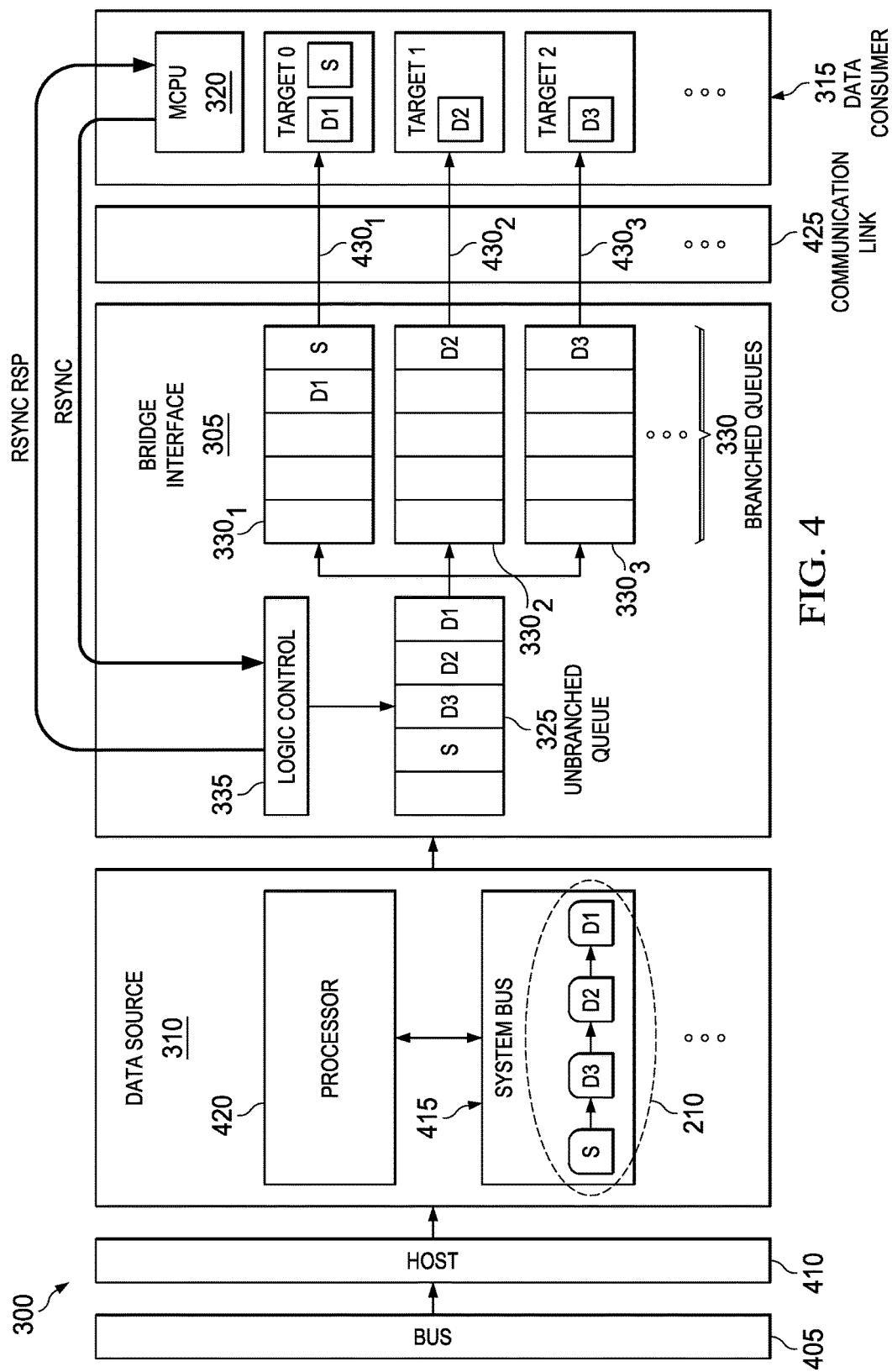

Reference is now made to the following descriptions taken in conjunction with the accompanying drawings, in which:

FIGS. 1A-1C present a flow diagram of example embodiments of a method of remotely synchronizing data communicated in an electronic computing system according to the principles of the present invention;

FIG. 2 illustrates a timing diagram for an example remote synchronization process of data according to one embodiment of the method presented in FIGS. 1A-1C;

FIG. 3 presents a block diagram of an example embodiment of an electronic computing system that remotely synchronizes data communicated in the system, according to embodiments of the method presented in FIGS. 1A-1C; and FIG. 4 illustrates a block diagram of another example embodiment of an electronic computing system that remotely synchronizes data communicated in the system, according to embodiments of the method presented in FIGS. 1A-1C.

DETAILED DESCRIPTION

Embodiments of the invention disclosed herein accommodate data-source devices that do not guarantee the ordering writing of data and associated semaphore data packets. The relaxed writing of such data and semaphore data packets from the source device to target memory locations is permitted while minimizing the above-mentioned performance limitations encountered when requiring strict ordered writing or when interrupting the writing.

Relaxed writing to target memory locations can be facilitated by the remote synchronization of data communicated remotely, that is, across a bridge interface device located in between the data-source and data-consuming devices. When the data-consuming device detects the semaphore being written to one target memory address, the data-consuming device can issue a synchronization command to the bridge interface device. The bridge interface device responds to the synchronization command with a synchronization confirmation reply when all of the data associated with the semaphore have been written to their target memory addresses data-consuming devices.

One embodiment is a method of remotely synchronizing data communicated in an electronic computing system. FIGS. 1A-1C presents a flow diagram showing example embodiments of a method 100 of remotely synchronizing data communicated in an electronic computing system according to the principles of the present invention.

With continuing reference to FIGS. 1A-1C throughout, the method 100 includes, in step 102, ordered writing of a data set of discrete data packets and a following associated semaphore packet from a source electronic device to a bridge interface device of the system. The method 100 also includes, in step 104, relaxed writing of the data set from the bridge interface device to discrete target memory addresses of a data-consuming electronic device of the system. The order of the data packets and the associated semaphore packet written to the target memory addresses in the relaxed writing step 104 is different than the order of the data packets and associated semaphore packet written in the ordered writing step 102. Because it implements the relaxed writing of step 104 the bridge interface device is sometimes referred to herein as a "relaxed producer."

The method 100 also includes, in step 106, monitoring, by a memory command processing unit of the data-consuming electronic device, the relaxed writing of the associated semaphore packet (e.g., as part of step 104) to one of the target memory addresses. In accordance with the method 100, upon detection of the associated semaphore having been written to the one target memory address, the memory command processing unit issues, in step 108, a synchronization command to the bridge interface device. In accordance with the method 100, after all of the data packets have been written to the target memory addresses, in step 110, the bridge interface device send a synchronization confirmation reply to the memory command processing unit.

The term data set, as used herein, refers to a plurality of data packets and the associated semaphore packet. Each data packet or semaphore packet can be or include units of digital information (e.g., encoded as 128-bit, 256-bit, or 512-bit units of binary data). The data packets can, e.g., include audio or image information upon which computations can be performed by an electronic processing unit of the data-consuming device according to the instructions provide by software, e.g., compiled to run on an electronic processing unit such as a central processing unit, CPU, or a graphical processing unit, GPU, of the data-consuming device. The semaphore packet includes digital information corresponding to the values of variables that are configured to track the writing of the data packets to the target memory addresses. In some embodiments, for example, the semaphore can be a sequence of data-tracking flag variables that change from one binary state (e.g., "0") to another binary state (e.g., "1") as each one of the data packets are written to one of the memory addresses.

The term ordered writing, as used herein, refers to a specific sequence (e.g., such as specified or required by a software program) of writing the discrete packets of data, and the associated semaphore packet, to different addressed locations of a memory storage location component of the bridge interface device.

The term relaxed writing, as used herein, refers to a sequence of writing the discrete data packets and the associated semaphore packet to the discrete target memory addresses of the data-consuming electronic device that is not the same as the sequence of ordered writing to the memory storage locations of the bridge interface device. That is, the sequence of writing the discrete data packets and the semaphore packet to the data-consuming electronic device is relaxed away from the sequence of ordered writing of these packets to the bridge interface device.

As used herein, the writing of the data set to the bridge interface device or to data-consuming electronic device includes both directly writing to the device and writing towards the device. For instance, in some embodiments as further discussed below, the ordered writing (step 102) from the source electronic device to the bridge interface device of the system can include the same order of writing to one or more intermediate device nodes of data transfer. For instance, in some embodiments as further discussed below, the relaxed writing (step 104) can include the same relaxed writing to intermediate devices such as a data interconnection device.

The data-consuming electronic device can be any device that has an electronic processing unit (e.g., CPU or GPU) that can perform computations on the data-packets that are written to memory storage locations accessible to the device.

The memory command processing unit refers a memory control circuit (e.g., a logic circuit configured as a state machine) that is configured to track where the data-packets are written to the memory storage components of the data-consuming electronic device.

The source electronic device can be any device that includes an electronic processing unit (e.g., CPU or GPU) configured to modify the data set (e.g., by performing arithmetic or mathematical operations on a data set transferred to the source device), and/or, includes intermediate device nodes of data transfer, such as a bus device or a host device configured to route the data set to the bridge interface device with the ordered writing of the data set in accordance with step 102.

For instance, in some embodiments, the source electronic device can be or include a peripheral component interconnect express (PCIe) serial computer expansion bus device configured to perform ordered writing, in accordance with step 102, of the data set to the bridge interface device. In some embodiments, the source electronic device can be or include a host bridge device (e.g., a network interface controller (NIC) that is configured as host bridge device) to facilitate the ordered writing of the data, as part of step 102, between the PCIe bus device and a system bus of the electronic processing unit of the source electronic device. Some such embodiments of the method 100 further include the same ordered writing of the data set as part of step 102 successively from a bus device to a host bridge device (step 112) and then the same ordered writing (step 114) from the host bridge device to a system bus device of an electronic processing unit of the source electronic device and then the same ordered writing (step 116) from the system bus device to an unbranched memory queue of the bridge interface device.

The term discrete target memory addresses, as used herein, refer to uniquely addressed locations of memory storage components (e.g., random access memory storage, RAM) of the data-consuming electronic device. Sometimes the discrete target memory addresses refer to addresses on memory storage components that are located on a same device platform as the data-consuming electronic device (e.g., on a circuit board housing memory levels of a GPU). In other instances, the discrete target memory addresses refer to addresses on memory storage components that are not located on the same device platform as the data-consuming electronic device. For instance, such memory storage components can be located on a device platform of the source electronic device (e.g., on a circuit board housing memory levels of a CPU, or, on bus or host device platforms).

Embodiments of the bridge interface device can include memory storage (e.g., RAM) configured as an unbranched memory queue (e.g., an unbranched memory queue such as a first-in-first-out, FIFO, unbranched memory queue) configured to receive the ordered writing of the data set from the source electronic device (step 102) and branched memory queues configured to receive portions of the data set and perform the relaxed writing of the data set (step 104) from the branched memory queues of the bridge interface device to discrete target memory addresses of the data-consuming electronic device. For instance, in some embodiments of the method 100, as part of step 102, the ordered writing of the data set from the source electronic device can be made in step 116 to an unbranched memory queue of the bridge interface device, and as part of step 104, in step 120, the same relaxed writing of different portions of the data set is made from the unbranched memory queue to different ones of branched memory queues of the bridge interface device.

In some embodiments, as part of step 104, the same relaxed writing of different portions of the data set is made, in step 122, from the branched memory queues of the bridge interface device to a plurality of parallel data communication lines of a data communication link device. In some embodiments, as part of step 104, the same relaxed writing of different portions of the data set is made, in step 125, from the parallel data communication lines to the target memory addresses of the data-consuming electronic device.

Upon receiving the synchronization confirmation reply, the data-consuming device is permitted to perform computations on the data associated with the semaphore without violating the order of data written to memory assumed by the software performing computations on the data. For instance, the data-consuming electronic device can be configured to perform, in step 127, parallel computations on the data-packets of the data set after the synchronization confirmation reply (step 110) is received by the memory command processing unit.

As further illustrated in FIGS. 1A-1C, in some embodiments, the remote synchronization of data in accordance with the method 100 is facilitated by issuing a flush instruction and flush confirmation responses. For instance, in response to the synchronization command (step 108) the bridge interface device can issue, in step 130, a flush instruction that causes at least a portion the data packets to be flushed from the bridge interface device to the target memory addresses. In step 132, flush confirmation responses are sent from the memory command processing unit to the bridge interface device as the memory command processing unit detects the portions of the data packets written to target memory addresses. In some embodiments, as part of step 110, the synchronization confirmation reply is sent (step 134) by the bridge interface device after receiving all of the flush confirmation responses.

As used herein, the term flush refers to the process of completing the relaxed writing of a data packet from the memory (e.g., one the branched memory queues) of the bridge interface device to its respective target memory address of the data-consuming electronic device. The term, flush confirmation response, as used herein refers to the process of sending a reply back from the memory command processing unit to the bridge interface device to confirm the completion of writing the data packet to the target memory address and thereby confirming that the data packet is fully visible for being read from the target memory address.

FIG. 2 illustrates certain aspects of the remote data synchronization described in the context an example embodiment of the method 100 featuring steps 130-134. FIG. 2 presents vertical timelines 202, 204, 206 corresponding to different times of writing operations occurring in the source electronic device (source), example target memory addresses of the data-consuming electronic device (target 0 and target 1) and the intervening bridge interface device (relaxed producer), respectively.

With continuing reference to FIGS. 1A-1C and 2, the method 100 comprises the ordered writing (step 102) of a data set 210 of two discrete data and an associated semaphore packets, i.e., the ordered sequence of writing W(D1), W(D2) and W(S), respectively to the bridge interface device (relaxed producer). The relaxed writing (step 104) of the data set 210 from the relaxed produced to the target memory addresses is illustrated by the different order of writing of the discrete data and semaphore, i.e., W(D2), W(S) and W(D1), to the target 0 and target 1 memory locations of the data-consuming electronic device (consumer) as compared to the ordering of writes from the source to the relaxed producer. The writing of W(D2), W(S) and W(D1), to the target 0 and target 1 memory locations is monitored (step 106) by memory command processing unit of the consumer and upon detecting W(S) having been written to target 0, the memory command processing unit issues (step 110) the synchronization command (RSYNC) the relaxed producer.

In accordance with step 130, the relaxed producer responds to the synchronization command by issues a flush instruction to target 0 and target 1 (e.g., F(D1), F(D2), respectively). In accordance with step 132 the memory command processing unit of the consumer sends flush confirmation responses to the relaxed producer as the memory command processing unit detects each of W(D2) and W(D1)) written to target 1 and target 0 respectively (e.g., FR(D1), FR(D2), respectively). In accordance with step 110, a synchronization confirmation reply (RSYNC Res) is sent by relaxed producer after receiving all of the flush confirmation responses.

Although data flush instruction (step 130, F(D1), F(D2)) is shown in FIG. 2 as being issued at different times from the relaxed producer, a series of such flush instructions does not have to be issued serially in time. For instance, as part of step 130 the bridge interface device (relaxed producer) could issue all of the flush instructions simultaneously. These simultaneously issued flush instructions could then causes a plurality of the data packets to undergo simultaneous parallel processes of relaxed writing of the data packets to their respective memory address. For example the writing of W(D1) and W(D2) to target 1 and target 0, respectively, could occur simultaneously.

In some embodiments the synchronization confirmation reply (step 110) is sent immediately after receiving all of the flush confirmation responses. However, in other embodiments, where another synchronization procedure that does not issue flush instructions and flush confirmation responses, is exclusively or additionally used, the synchronization confirmation reply is not sent in step 110 until also receiving all confirmation responses from the other synchronization procedure.

For instance, in some embodiments, the remote synchronization of data in accordance with the method 100 is facilitated by write confirmations being posted back to the bridge interface device automatically after all, or a portion of, the data packets are written to the target memory addresses, that is, without the issuance of a flush instructions or flush confirmation responses. For instance, as further illustrated in FIGS. 1A-1C, in response to the synchronization command (step 108) the bridge interface device, in step 140, tracks write responses automatically sent from the memory command processing unit of the data-consuming electronic device to the bridge interface device as the memory command processing unit detects that one of the data packets have been written to one of the target memory addresses. In such embodiments, as part of step 110, the bridge interface device sends the synchronization confirmation reply (step 142) after receiving all of the write responses.

As further illustrated in FIGS. 1A-1C, embodiments of the method 100 can use various means to facilitate communicating the synchronization command (step 108) and synchronization confirmation reply (110) between the memory command processing unit and the bridge interface device.

For instance, in some embodiments, as part of the sending the synchronization command in step 108, the command is sent from the memory command processing unit, in step 150, via one of a plurality of data communication lines of a data communication link device that is configured to transfer the data packets between the source electronic device and the data-consuming electronic device. In some such embodiments, as part of sending the synchronization confirmation reply in step 110, the reply is sent in step 152 from the bridge interface device via the same one of the data communication lines, although in other embodiments a different one of the data communication lines may be used.

For instance, in some embodiments, as part of issuing the synchronization command in step 108, the command is issued in step 160 from the memory command processing unit from a synchronization line. The synchronization line is different from a plurality of data communication lines of a data communication link device configured to transfer the data packets between the source electronic device and the data-consuming electronic device. Such an embodiment permits data transfers via all the data communication lines without delaying data communication to accommodate communicating the synchronization command on one of the lines. In some such embodiments, as part of sending the synchronization confirmation reply, the reply is sent in step 162 from the bridge interface device from the same one synchronization line, although in other embodiments one of the data communication lines may be used. In some embodiments, the synchronization line is a dedicated line, that is, the synchronization line is used only for communicating the synchronization command and/or the synchronization confirmation reply. In some embodiments, however, the synchronization command and the synchronization confirmation reply can be communicated, respectively, via two different dedicated synchronization lines.

For instance, in some embodiments, the synchronization command (step 108) includes sending, in step 170, periodic polling requests from the memory command processing unit to the bridge interface device. In response to the polling requests (step 170) the bridge interface device sends, in step 172, a series of writes-in-progress reply in response to each of the polling requests until all of the data-packet writes issued prior to the synchronization command (step 108) are written to their respective target memory address. Then, after all of the data-packets have been written to the target memory address, in step 173, the bridge interface device sends a final writes-completed reply in response to the most recent polling request (step 170). Receiving the writes-completed reply, in turn, causes the memory command processing unit to stop sending the polling requests (e.g., step 170 is halted).

As part of step 110 the bridge interface device sends the synchronization confirmation reply (step 174) after the writes-completed reply has been sent in step 173. In some embodiments, the periodic polling requests are sent (step 176) from the memory command processing unit via one of a plurality of data communication lines of a data communication link device configured to transfer the data packets between the source electronic device and the data-consuming electronic device. In other embodiments however the periodic polling requests can be sent (step 178) via a polling line (e.g., a dedicated polling line in some embodiments).

Another embodiment is an electronic computing system. FIG. 3 presents a block diagram of an example embodiment of an electronic computing system 300 for remotely synchronizes data communicated in the system, according to embodiments of the method 100 such as presented in FIGS. 1A-1C.

With continuing reference to FIGS. 1A-3 throughout, the system 300 comprises a bridge interface device 305 (Bridge Interface), a source electronic device 310 (Source) and a data-consuming electronic device 315 (Data Consumer). The source electronic device 305 is configured to provide an ordered writing (step 102) of a data set 210 of discrete data-packets (e.g., D1, D2, . . . ), and a following associated semaphore packet (e.g., S) from the source electronic device 310 to the bridge interface device 305. The bridge interface device 305 is configured to provide relaxed writing of the data set (step 104) to discrete target memory addresses (e.g., Target 0, Target 1, . . . ) of the data-consuming electronic device 310. As discussed in the context of FIGS. 1A-2, the order of the data packets and the associated semaphore packet written with the relaxed writing to the target memory addresses is different than the order of the data packets and associated semaphore packet written with the ordered writing.

The data-consuming electronic device 310 can include a memory command processing unit 320 (MPCU). The memory command processing unit 320 can be configured to issue a synchronization command (RSYNC) to the bridge interface device 305 upon detection of the associated semaphore having been written to the one target memory address (e.g., S written to Target 0). The bridge interface device 305 can be configured to send a synchronization confirmation reply (RSYNC RSP) to the memory command processing unit 320 after all of the data packets have been written to the target memory addresses (e.g., at least after D1 and D2 are written to Target 0 and Target 1, respectively).

As also illustrated in FIG. 3, in some embodiments, the bridge interface device 305 can include an unbranched memory queue 325, branched memory queues 330 and a logic control circuit 335. In some such embodiments, the unbranched memory queue 325 is configured to receive the ordered writing (step 102) of the data set 210 from the source electronic device 310. In some such embodiments, each of the branched memory queues (e.g., branched queues $330_1$, $330_2$, $330_3$) are configured to receive the same relaxed writing (step 120) of portions of the data set from the unbranched memory queue 325 (e.g., D1 to branched queue $330_1$, D2 to branched queue $330_2$, etc. . . . ). In some such embodiments, the logic control circuit 335 is configured to control the same relaxed writing of data-packets from the unbranched memory queue 320 to the branched memory queues 330 as part of step 120 and the same relaxed writing from the branched memory queues 330 to the data-consuming device 315 as part of step 125.

In some embodiments, the logic control circuit 335 is further configured to receive the synchronization command (RSYNC) issued by the memory command processing unit 320 as part of step 108, and, to send the synchronization confirmation reply (RSYNC RSP) back to the memory command processing unit 320 as part of step 110. For instance, in some such embodiments, the logic control circuit 335 is further configured to issue the flush instruction as part of step 130 and to receive the flush confirmation responses as part of step 132. In some such embodiments, the logic control circuit 335 is configured to track the write responses automatically sent from the memory command processing unit as part of step 140. In some such embodiments, the logic control circuit 335 is configured to send the synchronization confirmation reply after receiving all of the write confirmation replies (step 174).

Additional features of example embodiments of the system 300 are illustrated in the block diagram presented in FIG. 4.

In some embodiments of the system 300, the source electronic device 310 includes at least one or more of: a bus device 405 configured to route the data set 210 to the bridge interface device 305, a host device 410 configured to route the data set 210 from the bus device 405 to the bridge interface device 305 and/or a system bus device 415 of an electronic processing unit 420 (processor) configured to route the data set 210 from the host device 410 to the bridge interface device 305. In some embodiments, the bus device 405 and host device 410 are part of the source electronic device 310 while in other embodiments these are separate device components of the system 300. In any such embodiments, the same ordered writing of the data set 210 can be successively made from the bus device 405 to the host device 410 (step 112), from the host device 410 to the system bus device 415 (step 114) and then from the system bus device 415 to the bridge interface device 305 (step 116).

In some such embodiments, the electronic processing unit 420 is configured to modify the data set 210. For instance, the electronic processing unit 420 can perform mathematical operations on at least portions of the data set sent by the system bus 415 to the unit 420 and then send the modified data portions, as part of the data set 210, back to the system bus 415 and to the bridge interface device 305.

In some embodiments, the system 300 further includes a data communication link device 425 (Communication Link) having a plurality of parallel data communication lines (e.g., electrically conductive lines $430_1$, $430_2$, $430_3$, . . . ). The data communication link device 425 can be configured to receive the same relaxed writing of the data set from the bridge interface device as part of step 120 and transfer the same relaxed writing of the data set from the plurality of parallel data communication lines to the target memory addresses of the data-consuming electronic device 315 as part of step 125. In some embodiments, for instance, each one of the parallel data communication lines is configured to receive the relaxed writing one of the different portions of the data set from one of the branched memory queues and transfer that one different portion to the appropriate target memory address (e.g., data communication line $430_1$ receives data-packet D1 from branched queue $330_1$ and transfers D1 to target memory 0)

Those skilled in the art to which this application relates will appreciate that other and further additions, deletions, substitutions and modifications may be made to the described embodiments.

What is claimed is:

1. A method of remotely synchronizing data communicated in an electronic computing system, comprising:
    ordered writing of a data set of discrete data packets and a following associated semaphore packet from a source electronic device to a bridge interface device of the system;
    relaxed writing of the data set from the bridge interface device to discrete target memory addresses of a data-consuming electronic device of the system, wherein the order of the data packets and the associated semaphore packet written to the target memory addresses is different than the order of the data packets and associated semaphore packet written with the ordered writing;
    monitoring, by a memory command processing unit of the data-consuming electronic device, the relaxed writing of the associated semaphore packet to one of the target memory addresses;
    issuing a synchronization command from the memory command processing unit to the bridge interface device upon detection of the associated semaphore having been written to the one target memory address; and
    sending a synchronization confirmation reply from the bridge interface device to the memory command processing unit after all of the data packets have been written to the target memory addresses.

2. The method of claim 1, further including the same ordered writing of the data set from a bus device to a host bridge device, from the host bridge device to a system bus device of an electronic processing unit of the source electronic device and then from the system bus device to the bridge interface device.

3. The method of claim 1, wherein the ordered writing of the data set from the source electronic device is made to an unbranched memory queue of the bridge interface device, and, the same relaxed writing of different portions of the data set is made from the unbranched memory queue to different ones of branched memory queues of the bridge interface device.

4. The method of claim 1, wherein:
    the same relaxed writing of the data set is made from an unbranched memory queue of the bridge interface device to branched memory queues of the bridge interface device;
    the same relaxed writing of the data set is made from the branched memory queues to a plurality of parallel data communication lines of a data communication link device; and
    the same relaxed writing of the data set is made from the plurality of parallel data communication lines to the target memory addresses of the data-consuming electronic device.

5. The method of claim 1, wherein the data-consuming electronic device performs parallel computations on the data-packets after the synchronization confirmation reply is received by the memory command processing unit.

6. The method of claim 1, wherein, in response to the synchronization command:
    the bridge interface device issues a flush instruction that causes at least a portion the data packets to be flushed from the bridge interface device to the target memory addresses;
    flush confirmation responses are sent from the memory command processing unit to the bridge interface device as the memory command processing unit detects the portions of the data packets written to target memory addresses; and
    the bridge interface device sends the synchronization confirmation reply after receiving all of the flush confirmation responses.

7. The method of claim 1, wherein in response to the synchronization command:
    the bridge interface device tracks write responses automatically sent from the memory command processing unit to the bridge interface device as the memory command processing unit detects that one of the data packets have been written to one of the target memory addresses; and
    the bridge interface device sends the synchronization confirmation reply after receiving all of the write responses.

8. The method of claim 1, wherein the synchronization command is issued from the memory command processing unit from one of a plurality of data communication lines of a data communication link device configured to transfer the data packets between the source electronic device and the data-consuming electronic device.

9. The method of claim 8, wherein the synchronization confirmation reply is sent from the bridge interface device from the same one of the data communication lines.

10. The method of claim 1, wherein the synchronization command is sent from the memory command processing unit via a synchronization line, wherein synchronization line is different from a plurality of data communication lines of a data communication link device configured to transfer the data packets between the source electronic device and the data-consuming electronic device.

11. The method of claim 10, wherein the synchronization confirmation reply is sent from the bridge interface device via the synchronization line.

12. The method of claim 1, wherein the synchronization command includes sending periodic polling requests from the memory command processing unit to the bridge interface device, wherein the polling requests cause the bridge interface device to:
   send a writes-in-progress reply to the memory command processing unit in response to each of the polling requests until all of the data packets are written to the target memory addresses; and then
   send a writes-completed reply in response to the most recent of the polling requests after all of the data packets have been written to the target memory addresses.

13. The method of claim 12, wherein the periodic polling requests are sent from the memory command processing unit via one of a plurality of data communication lines of a data communication link device configured to transfer the data packets between the source electronic device and the data-consuming electronic device.

14. An electronic computing system for remotely synchronizing communicated data, comprising:
   a bridge interface device;
   a source electronic device, wherein the source electronic device is configured to provide an ordered writing of a data set of discrete data packets and a following associated semaphore packet from the source electronic device to the bridge interface device; and
   a data-consuming electronic device, wherein the bridge interface device is configured to provide relaxed writing of the data set to discrete target memory addresses of the data-consuming electronic device, and wherein:
      the order of the data packets and the associated semaphore packet written with the relaxed writing to the target memory addresses is different than the order of the data packets and associated semaphore packet written with the ordered writing,
      a memory command processing unit of the data-consuming electronic device is configured to monitor the relaxed writing of the associated semaphore packet to one of the target memory addresses,
      the memory command processing unit is configured to issue a synchronization command to the bridge interface device upon detection of the associated semaphore having been written to the one target memory address, and
      the bridge interface device is configured to send a synchronization confirmation reply to the memory command processing unit after all of the data packets have been written to the target memory addresses.

15. The system of claim 14, wherein the bridge interface device includes:
   an unbranched memory queue configured to receive the ordered writing of the data set from the source electronic device;
   branched memory queues, each of the branched memory queues are configured to receive the same relaxed writing of portions of the data set from the unbranched memory queue; and
   a logic control circuit configured to control the same relaxed writing of different portions of the data set from the unbranched memory queue to different ones of branched memory queues of the bridge interface device, and, the same relaxed writing from the branched memory queues to the data-consuming device.

16. The system of claim 15, wherein the logic control circuit is further configured to:
   receive the synchronization command issued by the memory command processing unit; and
   send the synchronization confirmation reply back to the memory command processing unit.

17. The system of claim 14, wherein the source electronic device includes at least one or more of:
   a bus device configured to route the data set to the bridge interface device,
   a host device configured to route the data set from the bus device to the bridge interface device, or
   a system bus device of an electronic processing unit of the source electronic device, the system bus device configured to route the data set from the host device toward the bridge interface device.

18. The system of claim 17, wherein the same ordered writing of the data set is successively made from the bus device to the host device, from the host device to the system bus device and then from the system bus device to the bridge interface device.

19. The system of claim 17, wherein the electronic processing unit is configured to modify the data set.

20. The system of claim 14, further including:
   a data communication link device having a plurality of parallel data communication lines, wherein:
      the data communication link is configured to receive the same relaxed writing of the data set from the bridge interface device and
      transfer the same relaxed writing of the data set from the plurality of parallel data communication lines to the target memory addresses of the data-consuming electronic device.

* * * * *